Dec. 13, 1960 L. BINDL 2,963,756
METHOD OF PROVIDING AN ELECTRODE ASSEMBLY
Filed Aug. 20, 1958
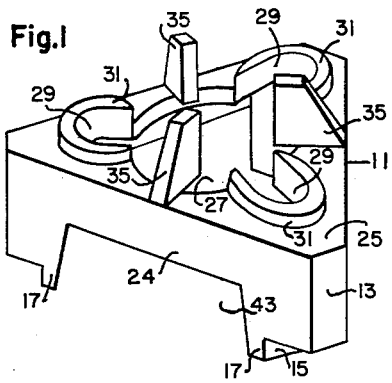
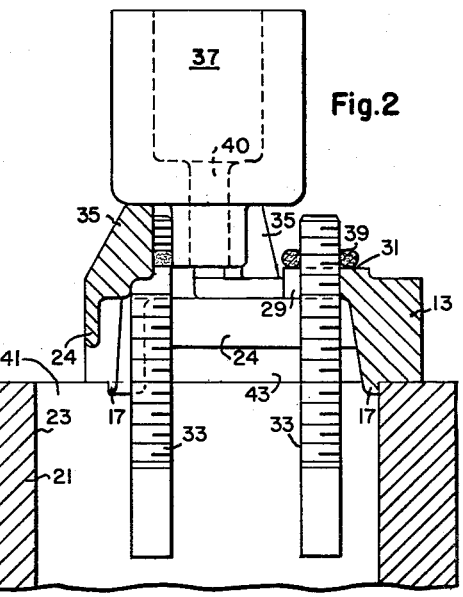
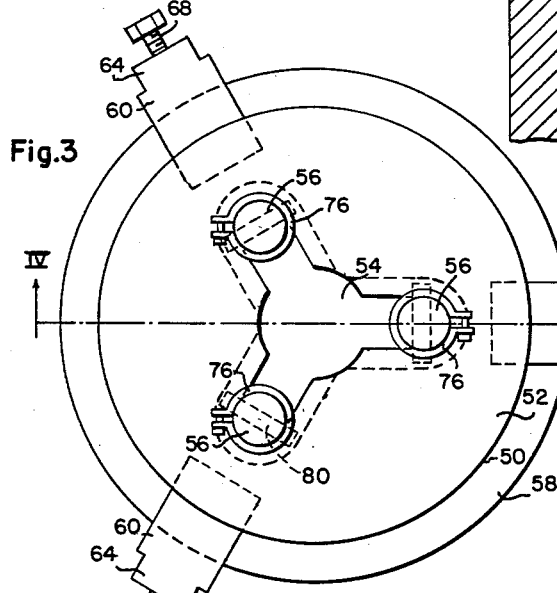
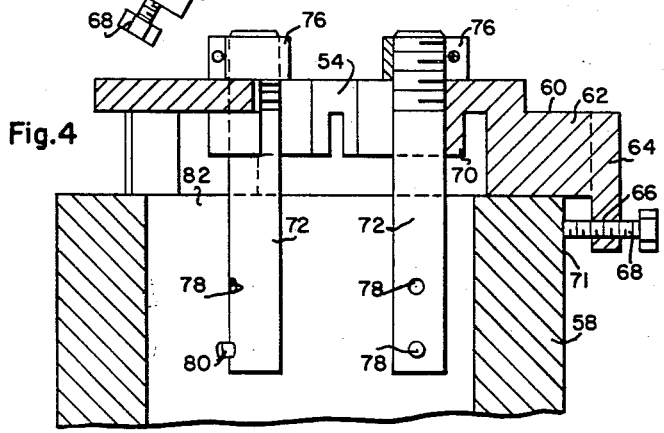
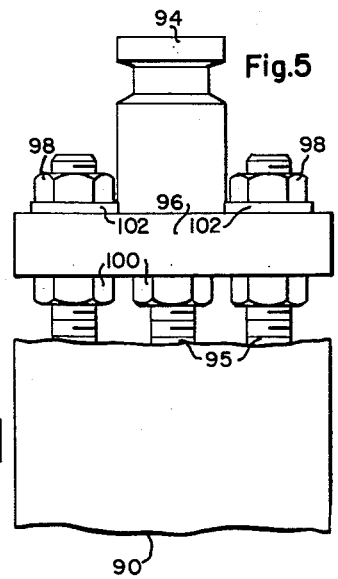

United States Patent Office

2,963,756
Patented Dec. 13, 1960

2,963,756

METHOD OF PROVIDING AN ELECTRODE ASSEMBLY

Ludwig Bindl, West Coxsackie, N.Y., assignor to Allegheny Ludlum Steel Corporation, Brackenridge, Pa., a corporation of Pennsylvania Filed Aug. 20, 1958, Ser. No. 756,101

1 Claim. (Cl. 22—139)

This invention relates to improvements in consumable electrodes for the consumable melting of metals and relates in particular to a method and apparatus for providing attachments studs to the hot top ends of cast electrodes.

In the manufacture of high purity alloys, metal is sometimes cast into critical size molds to obtain a shaped ingot that may be employed as an electrode for subsequent remelting under controlled conditions. For example, high temperature nickel and iron base metals may be produced by conventional air melting means, cast into electrode ingot molds and the resulting electrodes remelted in a vacuum or inert atmosphere in a consumable electrode furnace. In this manner a superior product substantially free of inclusions and segregation is obtained. However, many of such consumable electrode furnaces require a critical sized electrode, particularly in regard to length, in that a driving mechanism projects the electrode into a sealed crucible for a predetermined distance and a required length electrode is necessary to strike the arc between the electrode and the starting material in the crucible.

Heretofore, in the making of electrodes for use as consumable electrodes in the consumable melting of metals, many devices have been used for securing the electrodes to the driving mechanism. One of the most recently developed methods was to place a block in the bottom of a mold, the block having a stem projecting downward therefrom, and pouring the air melted material directly on the block, the heat of the poured metal effecting a welded joint with the block as the poured metal solidified. After the poured metal solidified, the ingot thus resulting could be used as an electrode, the stem of the block, of course, being utilized for securing the electrode to the drive mechanism.

Many difficulties have been encountered in employing such electrodes, as it will be readily apparent that in pouring the air melted material into the mold and the metal solidifies, shrinks and voids will be obtained at the hot top end of the resulting cast electrode. Thus, even though the electrode is formed with an integral stem at one end thereof, because of the presence of the shrinks and voids at the other end difficulty has been encountered in effecting the initial start of the melting of the electrode. Further, as will be apparent, the hot top end of the electrode thus formed contains impurities which normally float to the top of the poured ingot and concentrate at such portion. Thus, in order to insure good melting practice, the hot top end of the electrode so formed should, in operating practice, be cut from the electrode thus formed so as to provide a solid end on the electrode and remove impurities which might be concentrated therein. However, to crop the hot top end of the electrode will render the electrode too short for use in many of the consumable electrode furnaces or will require adjustment of the advancing mechanism.

It has now been found that by the method and apparatus of the present invention attachment studs may be incorporated into the top of the cast electrode in such a manner that any desired attaching apparatus may be attached to the hot top portion of the electrode for attachment to the consumable electrode furnace electrode advancing mechanism or such studs may serve to directly connect such electrodes in such a furnace.

Attachment means on the hot top end of consumable electrodes is a significant advance in consumable electrode melting. Not only is the length of the electrode retained for convenience in effecting the initial start of the melting of the electrode, but also loss of metal due to cropping is materially reduced. Once an arc and molten pool are formed in the crucible of a consumable electrode furnace, melting will continue although the quality of the electrode may vary, so that in most instances even the hot top may be melted where the arc is established on the sound end of the electrode. In any event the loss of metal through cropping is substantially lessened.

It is an object of the present invention to provide a connecting means to the hot top end of electrodes for remelting in consumable electrode furnaces.

It is also an object of the present invention to provide a method and apparatus whereby connecting studs may be provided to the hot top ends of electrode ingots.

A more specific object of the present invenion is to provide a method and apparatus whereby studs may be positioned as at least partially projecting into an electrode mold during pouring in order for the rising molten metal to engulf a portion of the studs so that upon cooling the studs will project from the hot top in a predetermined manner and thus provide connecting means for attaching the formed electrode to the driving means of a consumable electrode furnace.

Other objects and advantageous features of the present invention will be obvious from the following description when taken in conjunction with the accompanying drawings in which:

Figure 1 is a perspective view of a stud positioning apparatus constructed in accordance wtih the present invention;

Fig. 2 is a cross sectional view of the stud positioning apparatus of Fig. 1 shown as mounted on the open end of an electrode mold and with a pouring tundish poistioned to pour into said mold;

Fig. 3 is a top plan view of a stud positioning apparatus that constitutes another embodiment of the apparatus of the present invention shown as mounted on the open end of an electrode mold;

Fig. 4 is a cross sectional side view of the stud positioning apparatus of Fig. 3 taken along the line IV—IV thereof and shown as mounted on the open end of an electrode mold, and Fig. 5 is a representative side view of an ingot poured while employing the apparatus of Fig. 1 or that of Fig. 3 showing the positioned studs and attached apparatus for securing the electrode to a furnace ram.

In the drawing there is shown in Figs. 1 and 2 a stud positioning apparatus 11 constructed in accordance with the present invention. Apparatus 11 is substantially triangular in shape and has downwardly extending supporting lugs 13 located at each apex. Each supporting lug 13 contains a seating area 15 that is formed by a downwardly projecting guide and retaining lip 17 and the flat undersurface of a downwardly projecting portion of the supporting lug 13. The lip is designed to abut against the upper inside edge 23 of mold 21 as shown in Fig. 2 and thus retain the apparatus as positioned above the open upper end of the mold 21. The apparatus 11 must, of course, be designed to fit a specified diameter mold. Each seating area 15 of the lugs 13 is in the same horizontal plane being disposed to contact and seat on the upper edge 23 of mold 21 simultaneously.

Apparatus 11 contains side plates 24 positioned between each of the lugs 13 and abuts the edges of a cover plate 25 which is formed with a central opening 27 and three stud openings 29 which in the embodiment of Fig. 1 and Fig. 2 open into the central opening 27. Each of the stud openings 29 is provided with a partial collar 31 which provides some lateral support to the threaded studs 33 (Fig. 2) when positioned in the apparatus. It is to be noted that the portion of the stud openings 29 that is open to the central opening 27 will permit lateral movement of the stud 33 therein as will be described hereinafter. Positioned on cover plate 25 between each of the stud openings 29 there are located three radially spaced upwardly extending arms 35 disposed to receive a pouring tundish 37 on the upper ends thereof as shown in Fig. 2.

The lugs 13, side plates 24 and cover plate 25 are all integral parts of apparatus 11 in that the apparatus, including appurtenances such as arms 35, collars 31 and retaining lips 17, are preferably part of a single iron or steel casting. However, it is obvious that the various components of apparatus 11 may be formed singly or in several parts and may be joined to form the apparatus 11 by welding or any other joining means that will provide the necessary strength and heat resistance for the purpose set forth.

In the cross sectional view of Fig. 2 the apparatus 11 is illustrated as seated on the mold 21. Studs 33 are positioned as projecting through stud openings 29 downwardly into the mold. Asbestos rope 39 wound about the studs 33 and abutting against partial collar 31 of openings 29 prevents studs 33 from dropping through the stud openings 29 and into the mold 21, but will permit limited longitudinal movement of the studs as will be described hereinafter. Tundish 37 is positioned above opening 27 and rests on arms 35 of apparatus 11.

In operation the apparatus of Fig. 1 is positioned as shown in Fig. 2 above a mold 21. Molten metal from a ladle or other molten metal source (not shown) is poured into the open end of tundish 37 whereupon the molten metal funnels through the restricted pouring nozzle 40 of tundish 37, through the central opening 27 of apparatus 11 and into the mold 21. As the metal rises in the mold gases and fumes which normally evolve while metal is rising in such a mold, may escape from the mold through open areas or ports 41 created between the mold edge 23 and the apparatus 11 by the triangular shape of the apparatus 11 and the shape of the mold 21. To enlarge this area to permit adequate gas escapement there is provided an open area 43 (Fig. 1) in side plates 24 which, as may be seen, creates a large and adequate passageway for gas elimination when the apparatus 11 is positioned on a mold as shown in Fig. 2. Pouring of the metal is continued until the metal rising in the mold engulfs the non-threaded ends of the studs 33 a predetermined distance and in effect becomes welded thereto after which pouring is discontinued. With a predetermined length of the studs 33 embedded in the molten metal it is found that as the cast metal solidifies a natural shrinkage occurs and the solidifying metal tends to both retract and shrink to some extent. As the cast metal shrinks upon solidifying it is found that the asbestos rope 39 holding the studs has sufficient flexibility to permit longitudinal downward movement of the studs so that the studs will move with the shrinking metal to thereby maintain a good bond therebetween. There is also a tendency for the studs to migrate toward the center of the mold as the poured metal engulfs the studs and solidifies. Such movement is permitted since stud openings 29 open into the central opening 27. Thus, the studs 33 may be readily positioned in the hot top end of the electrode ingot as shown in Fig. 5 without shrinkage strain or stress on the studs or any of the pouring components.

In the embodiment shown in Figs. 3 and 4 there is a circular shaped apparatus 50 having a cover plate 52, a central opening 54 and three stud openings 56. Stud openings 56 open into central opening 54 to permit lateral movement of the studs 72 (Fig. 4). The apparatus 50 is of sufficient diameter to extend over at least a portion of the upper edge of the mold 58 and is provided with a plurality of downwardly depending, outwardly extending, spaced lugs 60, adjacent to the outer edge of the apparatus 50. Each of the lugs 60 is formed of a block 62 secured, as by welding or cast integrally with the lower surface of the cover plate 52 at the outside thereof, disposed to seat directly on the upper edge of the mold 58 and a downwardly projecting flange 64 disposed to be positioned in spaced relation to the outer wall of the mold 58. Each of the downwardly projected flanges 64 is provided with a central opening 66 through which a threaded stud 68 (see Fig. 4) is disposed to extend with the end of the stud 68 being in seated engagement with the outer wall of the mold 58 for positioning the apparatus 50 relative to the mold 58.

The three stud openings 56 are provided with downwardly extending collars 70 that serve to provide some lateral support to the studs 72 (Fig. 4) that are inserted to project downwardly into the mold 58. Each stud 72 is held in assembled position with respect to apparatus 50. The pressure applied by clamp 76 on studs 72, however, while being effective to normally hold the stud, is insufficient to prevent longitudinal movement of the stud as required by shrinkage of the ingot.

Each of the studs 72 projects downwardly into the mold 58 so as to be an adequate distance below the ultimate level of the metal for anchoring into the hot top of the electrode when poured. In this embodiment the lower ends of the studs 72 are provided with several openings 78 to provide an interlock with the resulting cast metal. Another stud 72 is shown to be provided with a projection 80 which also serves to provide an interlock with the electrode.

In operation, the apparatus of Fig. 3 is secured to a mold and studs 72 are positioned in stud openings 56 and are secured by C clamps 76 as shown in Fig. 4. The use of C clamps 76 is optional, the asbestos rope 39 employed for the purpose of retaining studs 33 shown in the embodiment of Figs. 1 and 2 being preferred. Molten metal is poured through central openings 54 into mold 58 until the bottom portions of studs 72 are engulfed in the molten metal. The clamps 76 permit the downward travel of the studs 72 caused by shrinkage of the metal while cooling. Migration of the studs 72 towards the center of the ingot may take place since stud openings 56 open into central opening 54.

While the molten metal is rising in mold 58 gases may escape through the ports 82 provided by the area between the apparatus 50 and the edge of the mold 58 between lugs 60.

Thus, it can be seen that connecting studs may be effectively located in the hot top end of ingot electrodes by means of the present invention that will permit improved consumable electrode melting practices.

Fig. 5 is an illustrative drawing showing the top portion of a cast electrode 90 with threaded studs 95 imbedded in the hot top. The electrode 90 and attached studs 95 are representative of the results obtained by employing either the apparatus of Figs. 1 and 2 or that of Figs. 3 and 4. A stem 94 designed for attachment to a consumable electrode furnace ram is attached to the studs 95 through attachment plate 96 that contains perforations corresponding in position to studs 95 and through which studs 95 have been projected. Plate 96 and thus stem 94 are firmly attached to studs 95 and electrode 90 by means of opposing nuts 98 and 100 and washers 102.

The above embodiments are given as illustrations of the device of the present invention, it being obvious that numerous modifications may be employed and that the present invention is not to be limited to the exact structure or operation set forth.

The apparatus of the present invention will normally be made of iron or steel; however, it is obvious that any material may be employed for the purpose that may be fabricated into the desired shape and that possesses adequate strength and heat resistant properties for such an application.

I claim:

An apparatus for the positioning of studs in the hot top end of a metal consumable electrode when casting molten metal of a metal selected from the group consisting of nickel-base alloys and iron-base alloys in an electrode mold comprising, a cover member formed with a central opening disposed to permit uninhibited teeming of molten metal into said electrode mold, the cover member having a plurality of second openings positioned in spaced equiaxed relation around said central opening and disposed to receive said studs as partially projected into the mold, said second opening being formed to open into said central openings so that said studs may migrate towards the center of said electrode upon shrinkage of said cast electrode, a plurality of supporting members for the cover member disposed to seat on the upper edge of said mold to maintain said central opening and second openings in a spaced relation above the open end of said mold, and a plurality of fluid passageways between said supporting members extending from the interior of said mold to the exterior of said mold.

References Cited in the file of this patent

UNITED STATES PATENTS

| | | |
|---|---|---|
| 2,049,148 | Arness | July 28, 1936 |
| 2,079,644 | Williams | May 11, 1937 |
| 2,196,432 | West | Apr. 9, 1940 |
| 2,295,007 | Plass | Sept. 8, 1942 |
| 2,480,516 | Stainer et al. | Aug. 30, 1949 |
| 2,480,899 | Bond | Sept. 6, 1949 |